BEST AVAILABLE COPY

BEST AVAILABLE COPY

Feb. 7, 1939. N. A. JUDSEN ET AL Des. Re. 20,999

WALL TELEPHONE SET

Original Filed March 30, 1936

Inventors:
Morris Rose
Nils A. Judsen.
By C. R. Soper
Atty.

BEST AVAILABLE COPY

Reissued Feb. 7, 1939

Des. Re. 20,999

UNITED STATES PATENT OFFICE 20,999

DESIGN FOR A WALL TELEPHONE SET

Nils A. Judsen and Morris Rose, Chicago, Ill., assignors to Kellogg Switchboard & Supply Company, Chicago, Ill., a corporation of Illinois Original No. 104,109, dated April 13, 1937, Serial No. 61,868, March 30, 1936, for 14 years. Application for reissue March 12, 1938, Serial No. 75,786. Term of patent 14 years

*To all whom it may concern:*

Be it known that we, Nils A. Judsen and Morris Rose, citizens of the United States of America and residents of Chicago, in the county of Cook and State of Illinois, have invented a new, original, and ornamental Design for a Wall Telephone Set, of which the following is a specification, reference being had to the accompanying drawing, forming a part thereof.

Figure 1:
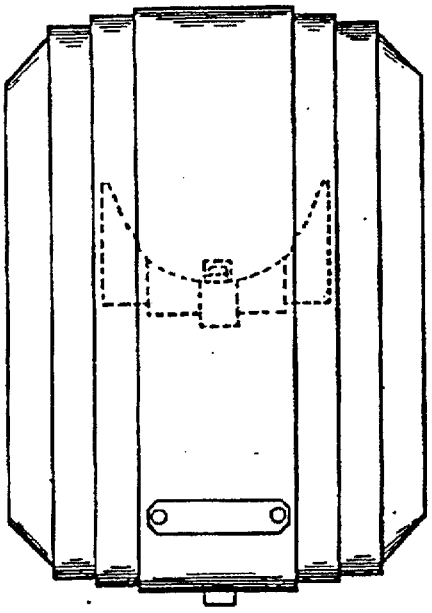
Fig. 1 is a face view of the wall telephone set.
Figure 2:
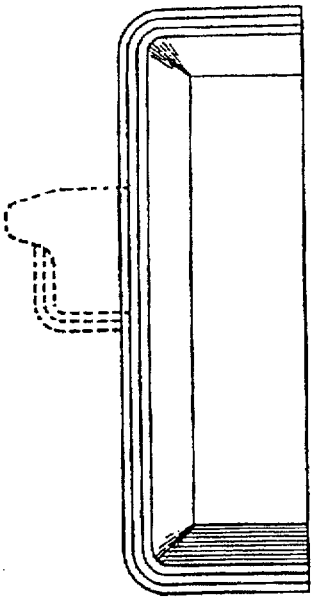
Fig. 2 is a side view of the same.
Figure 3:
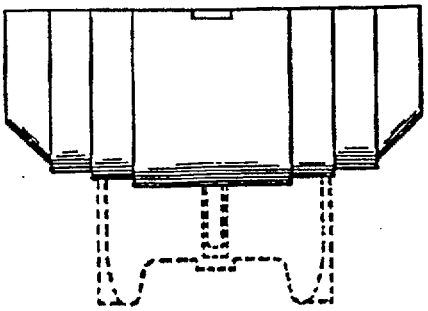
Fig. 3 is a view of the set as seen from above.

The essential feature of this design is the box structure as shown in solid lines in the drawing.

We claim:

The ornamental design for a wall telephone set, substantially as shown and described.

NILS A. JUDSEN.
MORRIS ROSE.